March 4, 1958 A. BENEDETTELLI 2,825,292
AUTOMATIC MACHINE FOR ALIMENTARY PASTE AND
OTHER PASTY MATERIALS
Filed Nov. 1, 1954

Inventor:
Amerigo Benedettelli
By:
Attorney

United States Patent Office 2,825,292
Patented Mar. 4, 1958

2,825,292

AUTOMATIC MACHINE FOR ALIMENTARY PASTE AND OTHER PASTY MATERIALS

Amerigo Benedettelli, Bari, Italy

Claims priority, application Italy April 24, 1954

5 Claims. (Cl. 107—14)

In automatic machines for alimentary paste and other pasty materials, in which air is extracted from the dough or mix prior to drawing same to final shape, it has been found useful to distribute the dough or mix so deaerated to a plurality of extruders.

In the machine according to the present invention this is obtained by passing the dough or mix, prior to final shaping, through a vacuum-operated vat for distributing the product. The product is taken from the mixing vat by a helical feed screw and is compressed through an extruder where, after being cut into small tablets, it reaches the vacuum-vat from which it is then distributed and compressed against a plurality of extruders for final shaping, by an equal number of helical compression screws.

In particular the invention concerns an automatic machine for alimentary paste and other pasty materials comprising a mixing vat, a vacuum-vat and a helical screw for conveying the dough or mix from said mixing vat to said vacuum-vat, characterized in that the vacuum-vat is provided with a plurality of helical compression screws adapted to compress the dough or mix against an equal number of extruders for final shaping. In order to make the invention more fully understood, one preferred embodiment thereof is illustrated diagrammatically merely by way of example in the accompanying drawing, wherein:

Figure 1:
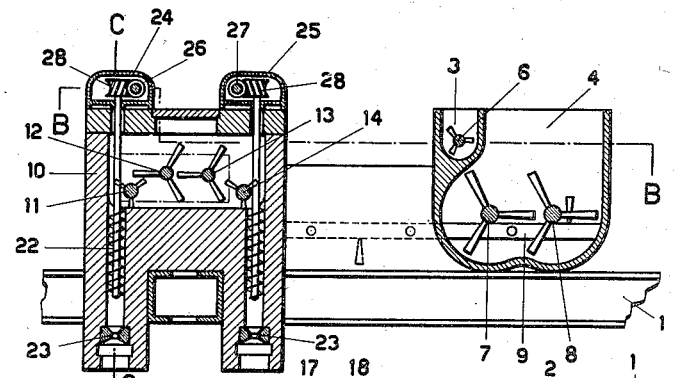
Fig. 1 is a cross-section of the machine along line A—A of Fig. 2.

Referring now to the drawing, 1 designates the frame of the machine, 2 the device for measuring water and meal or flour with other ingredients and 3, 4 and 5 the three compartments of the mixing vat, inside which there are provided respectively the mixing shafts 6, 7, 8 and 9 provided with vanes or stakes and actuated by an electric motor not shown in the drawing.

Laterally in respect to said mixing vat there is provided the distributing vat 10 in which vacuum is produced by means of a suction pump not shown in the drawing. Inside said distributing vat there are provided the mixing shafts 11, 12, 13 and 14 provided with vanes or stakes and actuated by the electric motor 15 by way of the gear train 16.

Figure 2:
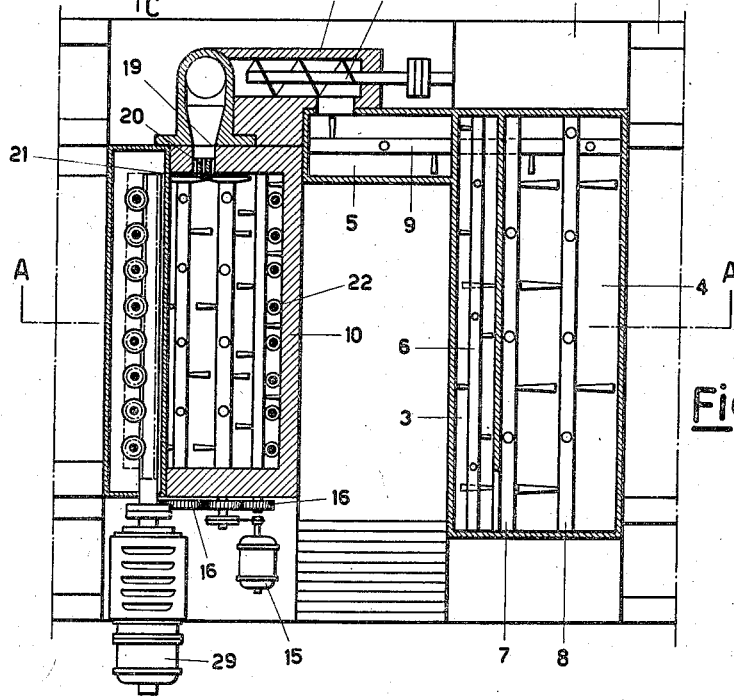
Fig. 2 is a horizontal section of said machine along line B—B of Fig. 1.
Figure 3:
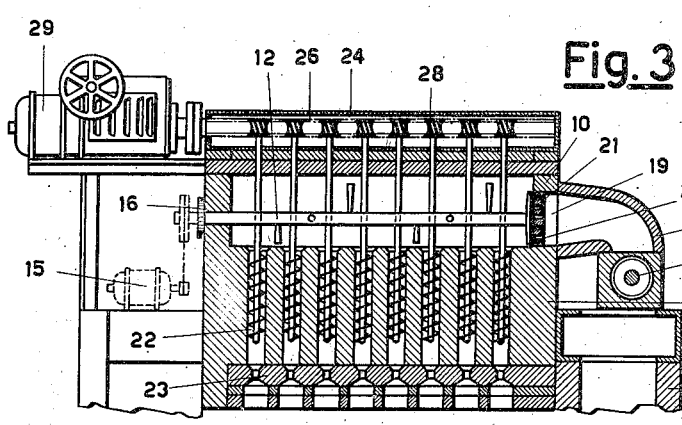
Fig. 3 is a longitudinal section of said machine along line C—C of said Fig. 1.

Said distributing vat 10 is in communication with the mixing vat by means of the cylinder 17 inside which there is accommodated rotatably the helical feed screw 18. In the inet 19 for the dough or mix in the distributing vat 10 there is provided the extruder 20 consisting of a die having a plurality of extrusion orifices. Knives 21, which are rigid with the mixing shafts 12 and 13 (see Figures 2 and 3), are provided to cut off the dough or mix extruded from extruder 20.

Along the longitudinal sides of the distributing vat 10, in positions perpendicular to the bottom thereof, there are provided a plurality of helical compression screws 22 adapted to distribute and compress the dough or mix against an equal number of extruders 23 provided below for final shaping. Each of these extruders 23 has a suitable extrusion orifice.

As shown in the drawing, the vaned shafts 11, 12, 13 and 14 are mounted in the distributing vat 10 in parallelism. The axes of the compression screws 22 are also mounted in parallelism with each other, and are mounted at right angles to the axes of the shafts 11, 12, 13, and 14. The enveloping cylinders of the compression screws 22, if extended, overlap the shafts 11 and 14, at opposite sides of the distributing vat, respectively. This insures that the dough is fed to the upper ends of the several compression screws 22 at a constant and substantially uniform rate.

Said helical compression screws 22 have their upper ends extending above the distributing vat inside the headings 24 and 25 wherein there are supported the worm screws 26 and 27. These screws rotate in engagement with the helical wheels 28 fitted onto the aforesaid ends of the helical compression screws 22.

Said worm screws 26 and 27 are actuated by the reducer motor units 29.

Operation of the machine is as follows: The measuring device 2 may be of conventional construction and is not described or illustrated in detail here. It may be, for instance, an open topped container pivoted off center to tilt when a predetermined weight of water and meal, or flour and other ingredients is in it, to dump its contents into the mixing compartments.

The water and the mealy or floury ingredients measured by the measuring device 2 descend into the mixing vat and by effect of the vanes or stakes of the mixing shafts 6, 7, 8, 9 said ingredients are worked while passing through to the proximity of the helical feed screw 18.

At this time the dough or mix is taken up by said helical feed screw 18 and compressed through the extruder 20 into the distributing vacuum-vat 10 whereinto it enters in the shape of small tablets by effect of the rotary knives 21.

In the vacuum-vat 10 said tablets are agitated by the vanes or stakes of the mixing shafts 11, 12, 13, 14 in such a manner as to form a dough or mix practically free from air; said dough or mix is then taken and compressed against the conventional extruders 23 by the helical compression screws 22 for definite shaping.

The embodiment above described illustrates the novel principle of the present invention but it is obvious that many modifications and variants may be made in the details of the embodiment without departing from the scope of the present invention.

It is apparent that the machine may serve not only to make alimentary paste but also any other materials such as e. g. clay or plastics, which have to be compressed by a screw.

With the machine provided by the present invention there are eliminated all of the energy losses which occur if the distribution of the paste, in the case of long paste, is effected by means of a special head with an individual compression chamber.

The compression and drawing or extruding at the two sides of the feed distributing vat by means of numerous small screws acting simultaneously on every side and actuated by means of a worm screw connected to a reducer motor unit which permits ample deviations from the number of revolutions of said screw, gives the possibility of working the product accurately in accordance with the kind of shapes to be worked.

With such an arrangement of the feed screws, the extruders may be inserted in vat 10 in such a manner that the interchange of said extruders may be made individually. In this way, whether the machine be working long paste or be working short paste, the machine can go on producing with halved output until the extruders are inserted one by one.

Owing to its peculiar structure the machine permits, moreover, to produce contemporaneously half of its output in the shape of long paste and half short paste; the long paste is then to be laid out over special rods and the short paste is to be delivered already packaged by a special band packing device installed under the frame of the machine.

Having obtained a more uniform pressure over the length of drawing or extruding and a maximum time therefor, one obtains with a machine constructed according to the present invention a considerable reduction in the amount of tails as compared with conventional machines; that is to say, production losses are cut down.

I claim:

1. In an automatic machine for preparing alimentary paste and other doughy materials, a distributing vat, feeding means mounted to feed dough into said vat, a plurality of dough-propelling and mixing shafts in said vat, said shafts having radially-extending vanes mounted thereon, said vanes being axially spaced along said shafts, a plurality of cylindrical dough compression chambers each opening at one end into said vat, an extruding die mounted in the other end of each of said compression chambers, a dough-propelling screw rotatably mounted in each of said compression chambers to feed dough from said vat through the extruding die that is mounted in said compression chamber, the enveloping cylinder of each of said screws, if extended, intersecting and overlapping the enveloping cylinder of at least one of said vaned shafts, and means for driving said screws and said shafts.

2. An automatic machine for preparing alimentary paste and other doughy materials according to claim 1, in which each dough-propelling screw is secured to a shaft that extends through said vat.

3. In an automatic machine for preparing alimentary paste and other doughy materials, a distributing vat, feeding means for feeding dough into said vat, a knife rotatably mounted in said vat and positioned to cut off dough fed therein, a plurality of shafts journaled in said vat to extend longitudinally thereof, each of said shafts having vanes for feeding the dough through said vat, a plurality of dough compression chambers each opening at one end into said vat, a final-shaping extruding die mounted in the other end of each of said dough compression chambers, a dough-propelling screw rotatably mounted in each of said compression chambers to feed dough from said vat through the last-named extrusion dies, the enveloping cylinder of each of said screws, if extended, intersecting and overlapping the enveloping cylinder of at least one of said vaned shafts, and means for driving said screws and said shafts.

4. An automatic machine for preparing alimentary paste and other doughy materials according to claim 3, in which said shafts are parallel to one another and in which the axis of each said dough-propelling screw extends at a right angle to the axes of said shafts.

5. An automatic machine for preparing alimentary paste and other doughy materials according to claim 3 in which said vat is under vacuum and in which said compression chambers are arranged along the longitudinal sides of said vat and extend downwardly therefrom and have their upper ends communicating with the vat, said final-shaping extrusion dies being mounted in the lower ends of the compression chambers, said shafts being mounted in parallelism, said dough-propelling screws also being mounted in parallelism, and the axes of said dough-propelling screws extending at a right angle to the axes of said shafts.

References Cited in the file of this patent

UNITED STATES PATENTS

| | | |
|---|---|---|
| 541,642 | Traiser | June 25, 1895 |
| 2,026,667 | Braibanti et al. | Jan. 7, 1936 |

FOREIGN PATENTS

| | | |
|---|---|---|
| 412,248 | Great Britain | June 25, 1934 |
| 568,094 | Great Britain | Mar. 19, 1945 |